US012634568B2

(12) United States Patent (10) Patent No.: US 12,634,568 B2
Dreiocker et al. (45) **Date of Patent: *May 19, 2026**

(54) VEHICULAR CAMERA WITH LENS BARREL ATTACHED TO IMAGER CIRCUIT BOARD

(71) Applicant: Magna Electronics Inc., Auburn Hills, MI (US)

(72) Inventors: Rene Dreiocker, Rochester Hills, MI (US); Jonathan D. Conger, Huntington Woods, MI (US); Jose Luis Zamudio Cabral, Rochester Hills, MI (US); Steven V. Byrne, Goodrich, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 39 days.

This patent is subject to a terminal disclaimer.

(21) Appl. No.: 18/751,484

(22) Filed: Jun. 24, 2024

(65) Prior Publication Data

US 2024/0364987 A1 Oct. 31, 2024

Related U.S. Application Data

(63) Continuation of application No. 17/661,923, filed on May 4, 2022, now Pat. No. 12,022,176.

(Continued)

(51) Int. Cl.
*H04N 23/54* (2023.01)
*B60R 11/04* (2006.01)
(Continued)

(52) U.S. Cl.
CPC ............. *H04N 23/54* (2023.01); *B60R 11/04* (2013.01); *H04N 23/51* (2023.01); *H04N 23/52* (2023.01);
(Continued)

(58) Field of Classification Search
CPC ........ H04N 23/51; H04N 23/52; H04N 23/54; H04N 23/55; H04N 23/57; B60R 11/04; B60R 2300/00; H05K 2201/10121; G02B 13/001; G03B 17/02; G03B 17/08; G03B 17/55; G03B 17/56; G03B 30/00;
(Continued)

(56) References Cited

U.S. PATENT DOCUMENTS 5,550,677 A 8/1996 Schofield et al.
5,670,935 A 9/1997 Schofield et al.
(Continued)

*Primary Examiner* — Twyler L Haskins
*Assistant Examiner* — Akshay Trehan
(74) *Attorney, Agent, or Firm* — HONIGMAN LLP

(57) ABSTRACT

A vehicular camera includes an imager printed circuit board (PCB) having an imager disposed at a first side of the imager PCB. A metal lens barrel accommodates a lens having a plurality of lens optics disposed within the metal lens barrel between an inner end and an outer end. The inner end of the metal lens barrel is adhesively bonded to the first side of the imager PCB via an adhesive ring. The adhesive ring is disposed between the inner end of the metal lens barrel and the first side of the imager PCB and circumscribes the imager at the first side of the imager PCB to enclose a region between the imager PCB and the lens, whereby the imager is disposed within the enclosed region between the imager PCB and the lens accommodated by the metal lens barrel.

44 Claims, 5 Drawing Sheets

Related U.S. Application Data

(60) Provisional application No. 63/201,602, filed on May 6, 2021.

(51) Int. Cl.

| | |
|---|---|
| *G03B 17/08* | (2021.01) |
| *H04N 23/51* | (2023.01) |
| *H04N 23/52* | (2023.01) |
| *H04N 23/55* | (2023.01) |
| *H04N 23/57* | (2023.01) |

(52) U.S. Cl.
CPC ............. *H04N 23/55* (2023.01); *H04N 23/57* (2023.01); *G03B 17/08* (2013.01)

(58) Field of Classification Search
CPC .......... G03B 2217/00; G03B 2217/002; G03B 2217/007; H04M 1/0264
See application file for complete search history.

(56) References Cited

U.S. PATENT DOCUMENTS

| | | | |
|---|---|---|---|
| 5,949,331 | A | 9/1999 | Schofield et al. |
| 6,690,268 | B2 | 2/2004 | Schofield et al. |
| 6,824,281 | B2 | 11/2004 | Schofield et al. |
| 7,038,577 | B2 | 5/2006 | Pawlicki et al. |
| 7,480,149 | B2 | 1/2009 | DeWard et al. |
| 7,720,580 | B2 | 5/2010 | Higgins-Luthman |
| 7,855,755 | B2 | 12/2010 | Weller et al. |
| 7,965,336 | B2 | 6/2011 | Bingle et al. |
| 8,256,821 | B2 | 9/2012 | Lawlor et al. |
| 8,542,451 | B2 | 9/2013 | Lu et al. |
| 9,233,641 | B2 | 1/2016 | Sesti et al. |
| 9,277,104 | B2 | 3/2016 | Sesti et al. |
| 9,451,138 | B2 | 9/2016 | Winden et al. |
| 9,487,159 | B2 | 11/2016 | Achenbach |
| 9,596,387 | B2 | 3/2017 | Achenbach et al. |
| 9,621,769 | B2 | 4/2017 | Mai et al. |
| 9,871,971 | B2 | 1/2018 | Wang et al. |
| 9,896,039 | B2 | 2/2018 | Achenbach et al. |
| 10,142,532 | B2 | 11/2018 | Mleczko |
| 10,230,875 | B2 | 3/2019 | Mleczko et al. |
| 10,264,219 | B2 | 4/2019 | Mleczko et al. |
| 10,272,857 | B2 | 4/2019 | Conger et al. |
| 10,855,890 | B2 | 12/2020 | Mleczko et al. |
| 10,875,469 | B2 | 12/2020 | Mleczko et al. |
| 12,022,176 | B2 | 6/2024 | Dreiocker et al. |
| 2012/0019940 | A1* | 1/2012 | Lu ........................... G02B 7/025 359/819 |
| 2013/0242099 | A1* | 9/2013 | Sauer ..................... H04N 23/57 348/148 |
| 2014/0298642 | A1* | 10/2014 | Sesti ...................... G02B 7/025 29/592.1 |
| 2014/0373345 | A1 | 12/2014 | Steigerwald |
| 2015/0124098 | A1* | 5/2015 | Winden ................. H04N 23/55 348/148 |
| 2015/0222795 | A1 | 8/2015 | Sauer et al. |
| 2015/0266430 | A1 | 9/2015 | Mleczko et al. |
| 2015/0365569 | A1* | 12/2015 | Mai ........................ G03B 17/55 348/373 |
| 2016/0037028 | A1 | 2/2016 | Biemer |
| 2016/0268716 | A1 | 9/2016 | Conger et al. |
| 2017/0133811 | A1 | 5/2017 | Conger et al. |
| 2017/0295306 | A1* | 10/2017 | Mleczko ................. B29C 45/77 |
| 2017/0302829 | A1* | 10/2017 | Mleczko ................. G08G 1/166 |
| 2018/0054555 | A1* | 2/2018 | Kunze .................... G08G 1/165 |
| 2018/0072239 | A1 | 3/2018 | Wienecke et al. |
| 2019/0124243 | A1* | 4/2019 | Mleczko ............... H04N 23/51 |
| 2020/0010024 | A1* | 1/2020 | Sesti ......................... B60R 1/02 |
| 2021/0382375 | A1 | 12/2021 | Sesti et al. |
| 2022/0103723 | A1 | 3/2022 | Skrocki et al. |
| 2022/0132007 | A1 | 4/2022 | Lu |

* cited by examiner

VEHICULAR CAMERA WITH LENS BARREL ATTACHED TO IMAGER CIRCUIT BOARD

CROSS REFERENCE TO RELATED APPLICATIONS

The present application is a continuation of U.S. patent application Ser. No. 17/661,923, filed May 4, 2022, now U.S. Pat. No. 12,022,176, which claims the filing benefits of U.S. provisional application Ser. No. 63/201,602, filed May 6, 2021, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 7,965,336; 5,949,331; 5,670,935 and/or 5,550,677, which are hereby incorporated herein by reference in their entireties.

SUMMARY OF THE INVENTION

A vehicular camera for a driver assistance system or vision system or imaging system of a vehicle includes a first or front housing portion, a second or rear housing portion, an imager printed circuit board (imager PCB), and a lens barrel or lens body that passes through the front housing portion and attaches at the imager PCB. The lens barrel (accommodating a lens or lens assembly therein) is directly attached, such as via an adhesive ring, at the imager PCB, with the adhesive ring circumscribing the imager to enclose an area between the imager PCB and the lens where the imager is disposed within the enclosed area between the imager PCB and the lens to, for example, reduce or preclude interference or occlusion from contaminants between the lens and imager.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to detect objects at or near the vehicle and in the predicted path of the vehicle. For example, a forward viewing camera disposed at and behind the windshield of the vehicle may capture image data of the scene forward of the vehicle for one or more driving assist systems of the vehicle. Optionally, one or more other cameras may be disposed at the vehicle with exterior fields of view, whereby the image data captured by those cameras may be processed for object detection and/or used to generate video images for viewing by the driver of the vehicle, such as to assist a driver of the vehicle in maneuvering the vehicle in a rearward direction. The vision system includes an image processor or image processing system that is operable to receive image data from one or more cameras and provide an output to a vehicle system and/or to a display device for displaying images representative of the captured image data to a driver of the vehicle. Optionally, the vision system may provide display, such as a rearview display or a top down or bird's eye or surround view display or the like.

Figure 1:
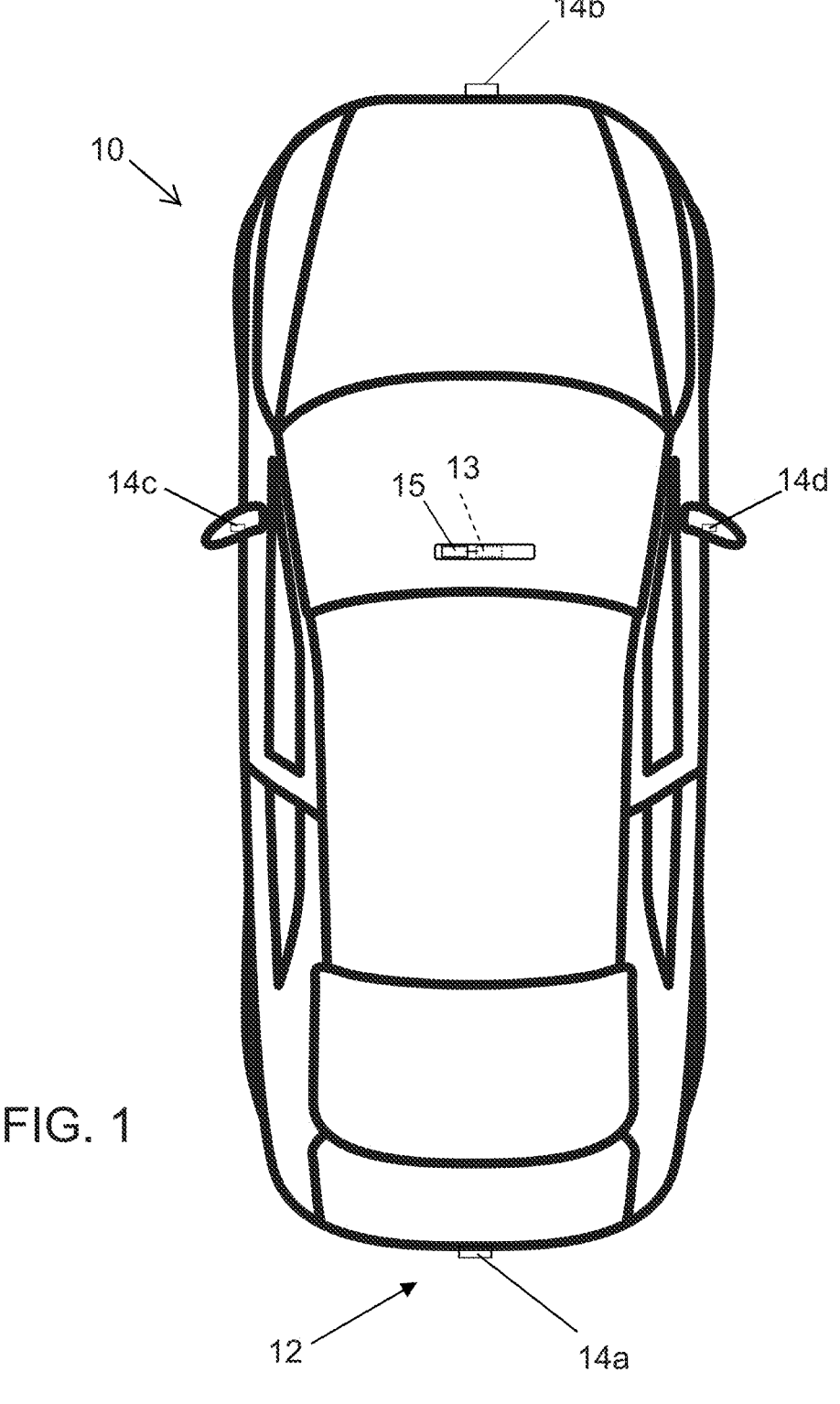
FIG. 1 is a perspective view of a vehicle with a vision system that incorporates a plurality of exterior cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system 12 may optionally include multiple exterior viewing imaging sensors or cameras, such as a forward viewing camera 14b at the front (or at the windshield) of the vehicle 10, and a sideward/rearward viewing camera 14c, 14d at respective sides of the vehicle 10), which captures images exterior of the vehicle 10, with the camera having a lens for focusing images at or onto an imaging array or imaging plane or imager of the camera (FIG. 1). Optionally, a forward viewing camera may be disposed at the windshield of the vehicle 10 and view through the windshield and forward of the vehicle 10, such as for a machine vision system (such as for traffic sign recognition, headlamp control, pedestrian detection, collision avoidance, lane marker detection and/or the like). The vision system 12 includes a control or electronic control unit (ECU) 13 having electronic circuitry and associated software, with the electronic circuitry including a data processor or image processor that is operable to process image data captured by the camera or cameras, whereby the ECU 13 may detect or determine presence of objects or the like and/or the system 12 provide displayed images at a display device 15 for viewing by the driver of the vehicle 10 (although shown in FIG. 1 as being part of or incorporated in or at an interior rearview mirror assembly of the vehicle 10, the control 13 and/or the display device 15 may be disposed elsewhere at or in the vehicle 10). The data transfer or signal communication from the camera to the ECU may comprise any suitable data or communication link, such as a vehicle network bus or the like of the equipped vehicle.

High-resolution automotive cameras are required to meet the increasing demands for machine vision systems used for vehicle safety and automation. For example, object detection systems may require high resolution image data to quickly and accurately detect objects and pedestrians in the field of view of one or more vehicular cameras and/or determine whether detected objects are in a path of travel of the vehicle. These cameras must have exceptional optical performance, withstand automotive test conditions and be cost competitive. Such cameras should provide optical path stability. To achieve the desired optical path stability, the relative lens-to-sensor position must be precisely held to within 10 microns or less throughout the range of automotive conditions and lifetimes. Materials must be very stable with coefficient of thermal expansion (CTE) counterbalancing considerations (athermalization). Such cameras should also provide image alignment.

In addition to precise focus, customers and vehicle manufacturers or original equipment manufacturers (OEMs) are also requiring precisely aligned images. To achieve the desired alignment of the captured image data, the pitch, yaw and roll must often be held to 0.25 degrees or less relative to defined datum points on the camera body. Many existing automotive cameras have the imager printed circuit boards (imager PCBs) fixed to the camera body and actively adjust the lens for focus and alignment. This approach does not allow for roll correction, which is necessary to achieve 0.25 degrees or less tolerances in all measurements.

Optical path cleanliness is also important to meet the requirements for modern vehicular vision systems. In other words, the path between the imager and the lens or optical element should be free of debris or other contaminants to avoid occluding the captured image data. Debris particles as small as 5 microns must be considered and avoided as possible optical path contaminants. Existing automotive cameras frequently use a shield component to isolate the optical path, but this part often has its own contaminants and adds cost.

Existing automotive machine vision cameras typically have sealing gaskets, screws, metal casted or machined components to achieve high resolution image data necessary for vision systems, driver assist systems, and display systems, which may not be cost competitive. As described further below, the camera or imaging assembly having an enclosed optical path provides a reduced cost solution.

Figure 2:
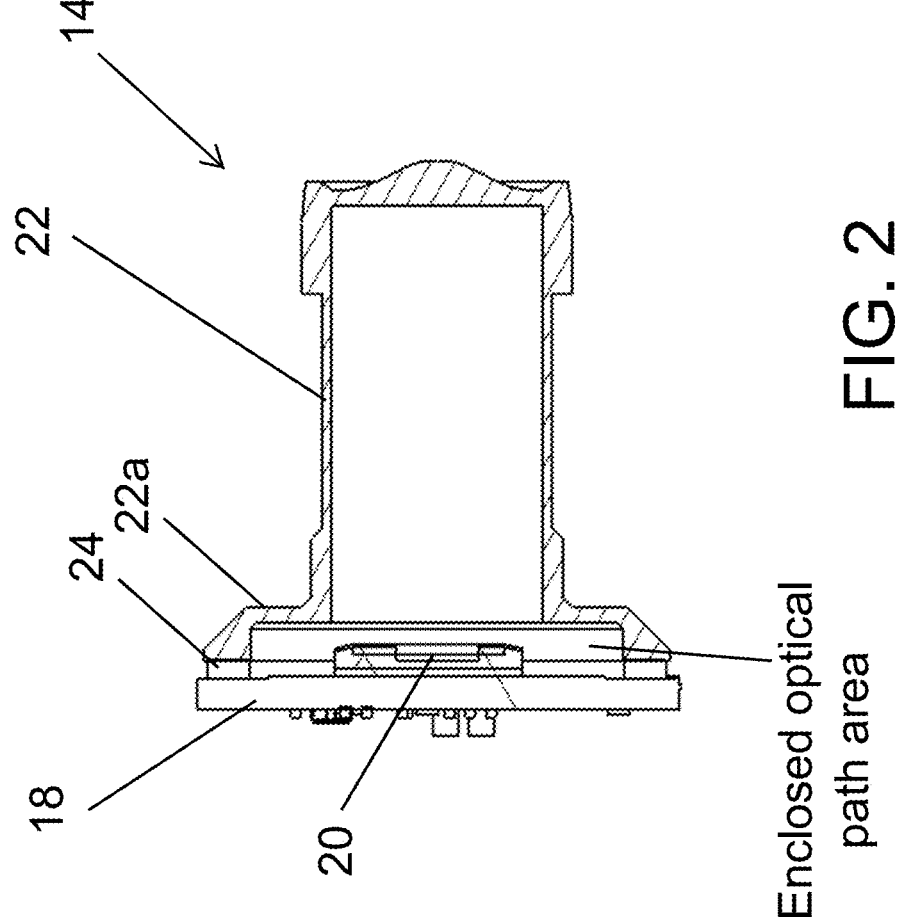
FIG. 2 is a sectional view of part of a vehicular camera.

As shown in FIG. 2, a vehicular interior camera or imaging assembly 14 comprises a printed circuit board (PCB) 18 with an imager 20 disposed at a side of the PCB 18. A unibody lens barrel 22 is adhesively bonded to the PCB 18 via an adhesive ring 24 disposed around the imager (the term "adhesive ring" is used herein to describe adhesive dispensed between the lens barrel and the PCB in a manner that fully circumscribes the imager, such as a ring or circular layer or bead of adhesive disposed at the end of the lens barrel or at the PCB). The unibody lens barrel 22 may have a machine-turned metal barrel or body (such as machine-turned aluminum or the like) that accommodates a lens or plurality of lens optics within and along the barrel 22. The adhesive ring 24 bonds a base portion 22a of the unibody lens barrel 22 to the imager side of the PCB 18 and encloses the optical path of the lens and imager to keep the optical path free of contaminants. In other words, the sealing of the lens barrel 22 directly to the PCB 18 seals the optical path area between the imager 20 and the lens or optical elements of the lens barrel 22. Contaminants are precluded from entering the optical path area because the optical path area (e.g., interior area of the lens barrel 22 and base portion 22a surrounding the imager 20) does not fluidly connect to the environment. The adhesive ring 24 may circumscribe or fully circle the imager 20 to create a continuous seal between the lens barrel 22 and the PCB 18 around the imager 20. That is, the adhesive ring 24 circumscribes the imager 20 and does not encroach on the imager 20 such that there is an air gap or space between the imager and the lens. The adhesive ring 24 seals around the enclosed area and forms a barrier that blocks ingress of contaminants into the enclosed area or onto the imager.

That is, the camera 14 uses adhesive attachment of the lens barrel 22 directly to the imager PCB 18. The PCB 18 and imager 20 may be adjusted in six axes to achieve the necessary tolerances and the adhesive ring 24 may be cured or at least partially cured when the imager 20 and lens are aligned. In the illustrated embodiment, the lens barrel 22 adhesively attaches to the imager PCB 18 along the perimeter edge region of the PCB 18 and thus encloses the imager 20 and any other electronic component on the imager side of the PCB 18 within the enclosed optical path area (i.e., between the imager PCB and the lens barrel). The lens barrel 22 may also be sealed or provide a barrier to ingress of contaminants into the optical path area. For example, the lens barrel may comprise a sealed construction, such as a unibody lens barrel accommodating one or more lens or optic elements. The unibody lens barrel may comprise a unitary construction that is formed around and seals against the lens optics of the lens accommodated by the lens barrel. Thus, when the lens barrel 22 is adhesively attached at the imager side of the imager PCB, the optical path area between the imager and the lens is completely sealed by the cured adhesive at the imager PCB 18 and the sealed construction of the lens barrel 22.

Figure 3:
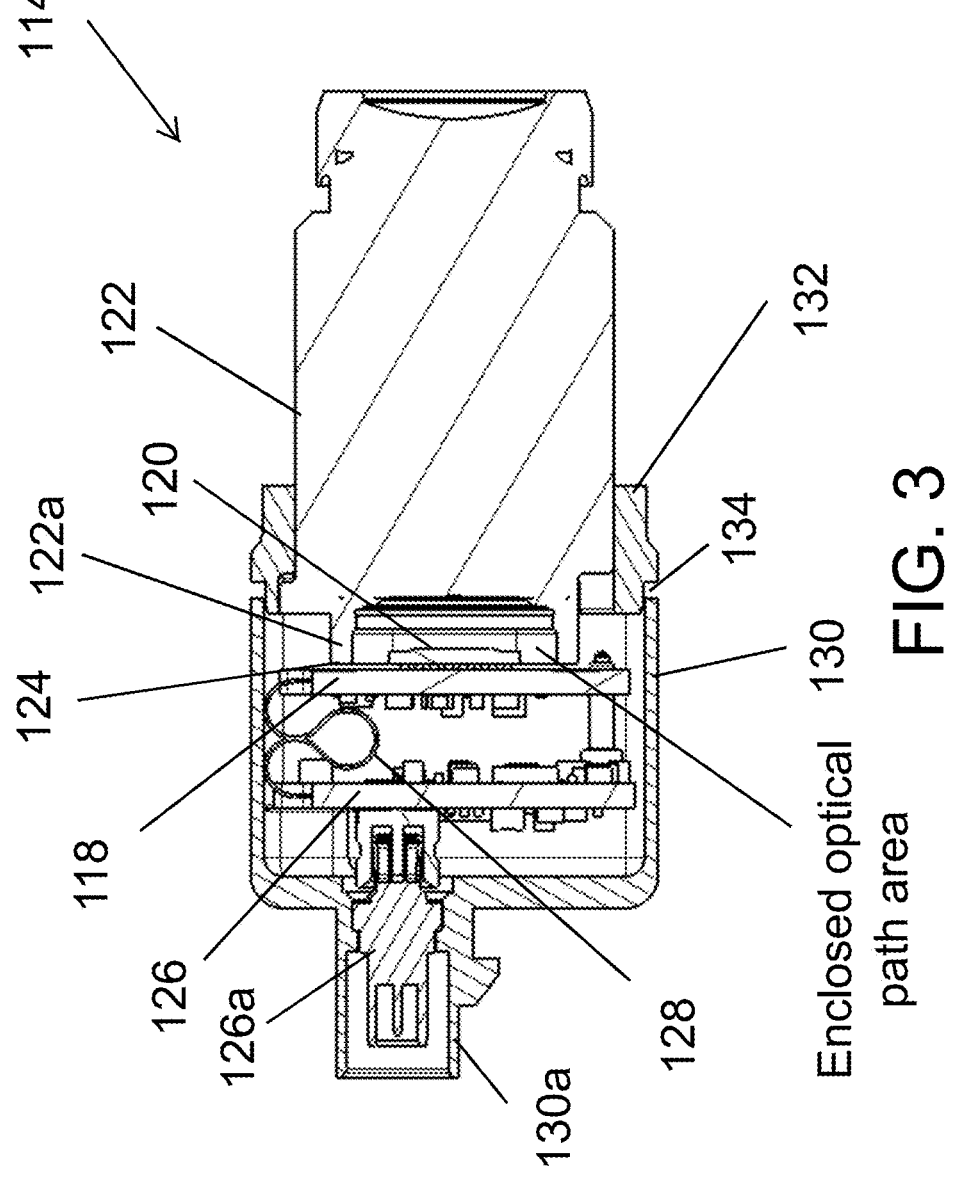
FIG. 3 is a sectional view of another vehicular camera.

Referring now to FIG. 3, a vehicular exterior camera 114 comprises an imager printed circuit board (imager PCB) 118 with an imager 120 disposed at a side of the PCB 118. A unibody lens barrel 122 is adhesively bonded to the imager PCB 118 via an adhesive ring 124 disposed around the imager. The adhesive ring 124 may circumscribe or fully circle the imager 120 to create a continuous seal between the lens barrel 122 and the PCB 118 around the imager 120. The camera 114 includes a connector printed circuit board (connector PCB) 126, with circuitry of the imager PCB 118 electrically connected to circuitry of the connector PCB 126 via a flexible board connector 128 (which reduces or eliminates potential imager PCB stress/movement).

The camera 114 includes a rear housing portion or rear cover 130 and a front housing portion or cover 132 that house the PCBs within the camera 114. The front housing portion 132 includes a passageway that receives the lens barrel 122. The lens barrel 122 may be threadably received at the front housing portion 132 and extends through the front housing portion 132 to attach at the imager side of the imager PCB 118. Optionally, the lens barrel 122 is threadably and adhesively attached to the front housing portion 132. The front and rear housing portions are mated or joined together, such as via adhesive or other fastening means. Optionally, the rear housing portion 130 and the front housing portion 132 may comprise metal elements, such as impact extruded aluminum or the like, and may be metal laser welded together at a welded joint or mating region 134 of the housing.

The connector PCB 126 includes a header connector that electrically connects to an inner end of an electrical connector 126a. The rear housing portion 130 includes a connector portion 130a that receives or circumscribes an outer end of the electrical connector 126a and that is configured to electrically connect the electrical connector 126a to a vehicle connector when the camera 114 is installed at a vehicle. For example, the electrical connector 126a may comprise a coaxial connector for connection to an end of a vehicle coaxial cable when the camera 114 is installed at a vehicle. The electrical connection of an inner end of the electrical connector 126a to the header connector at the connector PCB 126 may comprise a coaxial connection or a multi-pin connection. Thus, an inner end of the electrical connector 126a, such as a coaxial connector or connecting element, electrically connects to the header connector of the connector PCB 126 within the internal cavity of the camera housing and an outer end of the electrical connector 126a is disposed within or at the connector portion 130a of the rear housing portion 130 for receiving and electrically connecting the camera to the vehicle connector.

The unibody lens barrel 122 of the camera 114 may have a machine-turned metal barrel or body (such as machine-turned aluminum or the like) that accommodates a lens or plurality of lens optics within and along the barrel. The adhesive ring 124 bonds a base portion 122a of the unibody lens barrel 122 to the imager side of the imager PCB 118 and encloses the optical path of the lens and imager 120 to keep the optical path free of contaminants. The lens barrel 122 may attach to the imager PCB 118 at a position on the PCB 118 inboard from a perimeter edge region of the PCB 118 so that some electronic components on the imager side of the PCB are within the enclosed area of the lens barrel and some electronic components on the imager side of the PCB are outside of the lens barrel 122. For example, only the imager 120 may be within the enclosed area of the lens barrel 122. Thus, with the lens barrel 122 directly adhered to the imager PCB 118, the lens and imager 120 may be adjusted relative to one another during alignment to achieve the necessary tolerances (such as yaw, pitch, and roll each within 0.25 degrees) to capture the high resolution image data needed by the vehicle systems. Additionally, sealing the lens barrel 122 to the imager PCB 118 encloses the optical path to preclude debris particles, being as small as 5 microns or less, from interfering with or occluding the optical path between the lens and the imager 120.

That is, the camera 114 uses adhesive attachment of the lens barrel 122 directly to the imager PCB 118. The PCB 118 and imager 120 may be adjusted in six axes and the adhesive ring 124 may be cured or at least partially cured when the imager 120 and lens are aligned.

The camera 114 may use a unibody lens barrel 122 that comprises a cylindrically machined turned lens barrel that is directly glued to the imager PCB 118. The cylindrical lens barrel or body passes through the front cover 132 and directly attaches to the imager PCB 118. This reduces tolerances and optimizes focus stability. Cost is also reduced because the lens barrel or body can still be cylindrical for machine turning. The lens body or barrel may be held in the front cover or lens holder 132 with threads and adhesive but may be a press-fit with glue and/or O-ring for sealing the lens at the lens holder or front cover or camera portion.

Thus, the lens barrel 122 is received in the lens holder or front housing 132 and extends through the front housing 132 to be adhesively attached to the imager side of the imager PCB 118. The front housing 132 is attached to the rear housing 130 and, together with the rear housing 130, encompasses and houses the PCBs. The rear housing 130 includes side walls that extend along and encompass the PCBs to join with the front housing 132 at the interface or joining region 134 of the housing. Accordingly, the lens barrel 122 attaches to the imager PCB 118 to enclose the optical path between the imager 120 and the lens of the lens barrel 122 and the front housing 132 separately attaches to the rear housing 130 and not the imager PCB 118.

Figure 4:
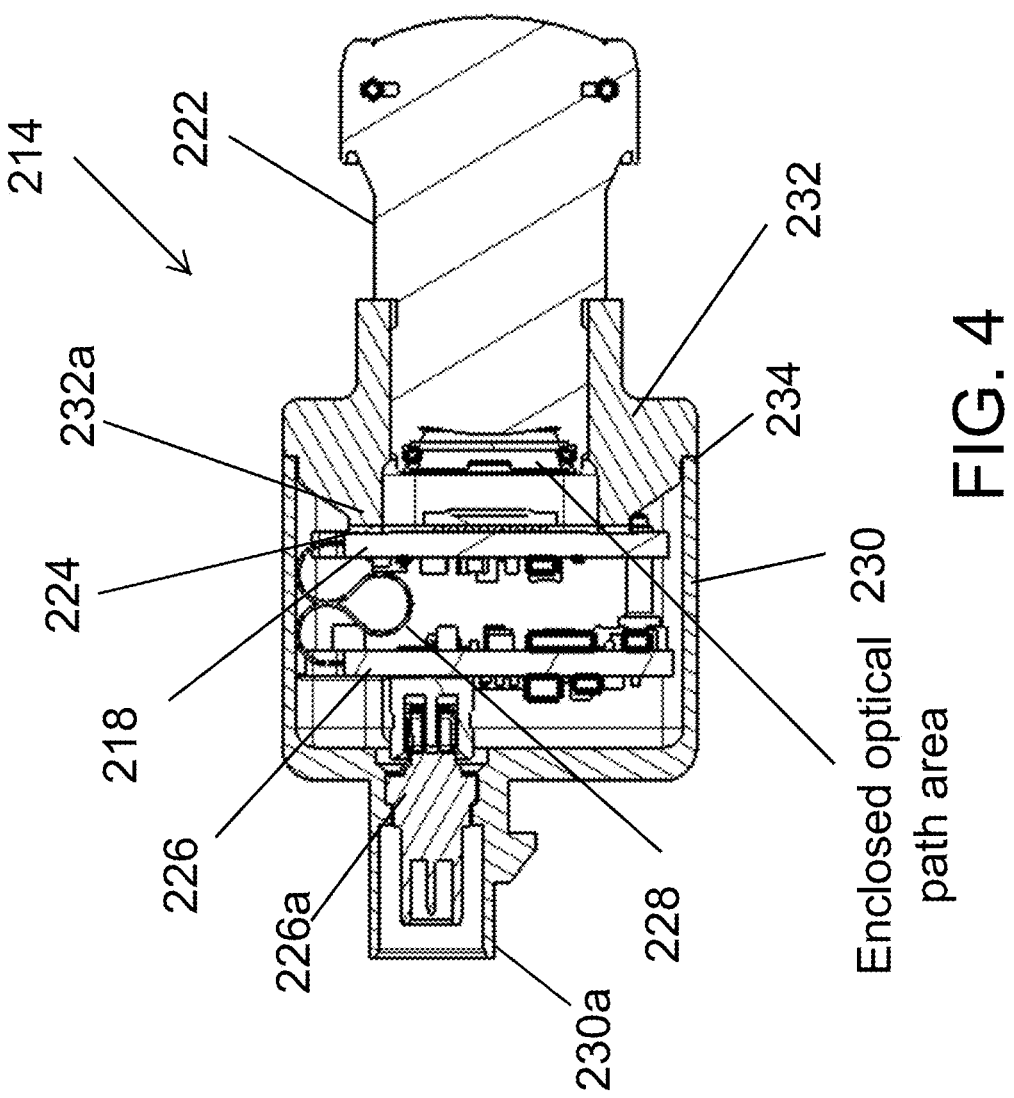
FIG. 4 is a sectional view of another vehicular camera.

Optionally, the lens barrel and/or the front housing may attach directly to the imager PCB to enclose the optical path area between the imager and the lens. For example, the front housing may receive the lens barrel and the front housing may adhesively attach to the imager PCB and mate with the rear housing portion. For example, and with reference to FIG. 4, a vehicular exterior camera 214 comprises an imager printed circuit board (imager PCB) 218 with an imager 220 disposed at a side of the PCB 218. A unibody lens barrel 222 is threaded into a front cover or front housing portion 232, which is adhesively bonded to the imager PCB 218 via an adhesive ring 224 disposed around the imager 200. In other words, the lens barrel 222 is threadably received at the front housing 232 and the front housing 232 is adhesively attached at the imager PCB 218 via the adhesive ring 224. The adhesive ring 224 may circumscribe or fully circle the imager 220 to create a continuous seal between the front housing 232 and PCB 218 around the imager 220. The camera 216 includes a connector printed circuit board (connector PCB) 226, with circuitry of the imager PCB 218 electrically connected to circuitry of the connector PCB 226 via a flexible board connector 228 (which reduces or eliminates potential imager PCB stress/movement). This exterior camera 214 provides a reduced size camera and has the imager PCB 218 glued to the lens holder 232 for space optimization.

The camera 214 includes a rear housing portion or rear cover 230 that, with the front housing portion or cover 232, form a housing that houses the PCBs within the camera. The front housing portion 232 and the rear housing portion 230 may attach to one another separate (i.e., at different positions) from the attachment of the imager PCB 218 to the front housing portion 232. The rear housing portion 230 and the front housing portion 232 may comprise metal elements, such as impact extruded aluminum or the like, and may be metal laser welded together at a welded joint or mating region 234 of the housing.

The connector PCB 226 includes a header connector that electrically connects to an inner end of an electrical connector 226a. The rear housing portion 230 includes a connector portion 230a that receives or circumscribes an outer end of the electrical connector 226a and that is configured to electrically connect the electrical connector 226a to a vehicle connector when the camera 214 is installed at a vehicle. For example, the electrical connector 226a may comprise a coaxial connector for connection to an end of a vehicle coaxial cable when the camera 214 is installed at a vehicle. The electrical connection of an inner end of the electrical connector 226a to the header connector at the connector PCB 226 may comprise a coaxial connection or a multi-pin connection.

The unibody lens barrel 222 has a machine-turned metal barrel or body (such as machine-turned aluminum or the like) and accommodates a lens or plurality of lens optics within and along the barrel. The adhesive ring 224 bonds a base portion 232a of the front cover 232 to the imager PCB 218 and encloses the optical path of the lens and imager 220 to keep the optical path free of contaminants. Optionally, the lens barrel 222 received within the front housing portion 232 may also adhesively attach to the imager PCB 118, where the lens barrel 222 adhesively attaches to the PCB 118 via the same or a different adhesive ring and inboard of where the front housing portion 232 attaches to the PCB 218. That is, the camera 214 uses adhesive attachment of the front cover 232 directly to the imager PCB 218. The PCB 218 and imager 220 may be adjusted in six axes and the adhesive ring 224 may be cured or at least partially cured when the imager 220 and lens are aligned.

The rear housing 230 and the lens holder 232 may comprise any suitable material. For example, both components may comprise a metallic material or both components may comprise a plastic or polymeric material. For example, both components may comprise aluminum, such as 1100, 6061 or 4047 grade aluminum or the like or alloys thereof.

Figure 5:
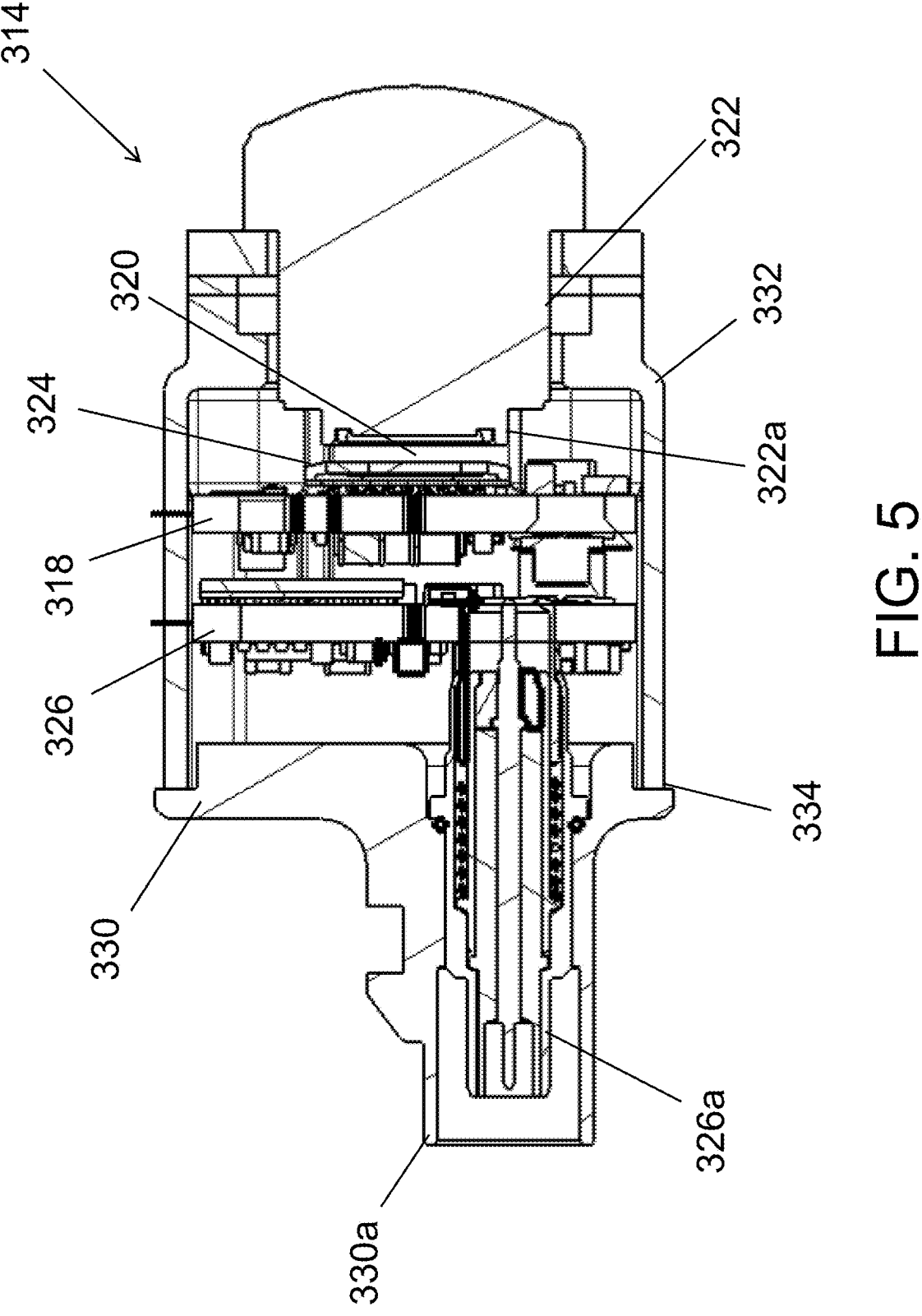
FIG. 5 is a sectional view of another vehicular camera.

As shown in FIG. 5, a vehicular exterior camera 314 includes an imager printed circuit board (imager PCB) 318 with an imager 320 disposed at a side of the PCB 318. A lens barrel 322 is threaded into a front cover or front housing portion 332 and the lens barrel 322 extends through the front housing portion 332 and is adhesively bonded to the imager side of the PCB 318 via an adhesive ring 324 disposed around the imager 320. The adhesive ring 324 may circumscribe or fully circle the imager 320 to create a continuous seal between the front housing 332 and PCB 318 around the imager 320. The camera 316 includes a connector printed circuit board (connector PCB) 326, with circuitry of the imager PCB 318 electrically connected to circuitry of the connector PCB 326.

The camera 314 includes a rear housing portion or rear cover 330 that mates to or joins with the front housing portion 332 to house the PCBs between the front housing 332 and rear housing 330. The rear housing portion 330 and the front housing portion 332 may comprise metal elements, such as impact extruded aluminum or the like, and may be metal laser welded together at a welded joint or interface or mating region 334 of the housing. The front housing portion 332 includes side walls that extend along and encompass the PCBs to mate with a substantially planar rear housing 330 such that the lens barrel 322 may be adhesively attached at the imager PCB 318 (and optionally the imager PCB connected to the connector PCB) prior to the front housing 332 being attached to the rear housing 330. Thus, the optical element of the lens barrel 322 may be optically and physically aligned with the imager 320 prior to the front housing 332 being attached to the rear housing 330.

The connector PCB 326 includes a header connector that electrically connects to an electrical connector 326a and the rear housing portion 330 includes a connector portion 330a that receives or circumscribes an outer end of the electrical connector 326a and that is configured to electrically connect the electrical connector 326a to a vehicle connector when the camera 314 is installed at a vehicle. For example, the electrical connector 326a may comprise a coaxial connector for connection to an end of a vehicle coaxial cable when the camera 314 is installed at a vehicle. The electrical connection of an inner end of the electrical connector 326a to the header connector at the PCB may comprise a coaxial connection or a multi-pin connection.

The lens barrel 322 may comprise a unibody lens barrel having a machine-turned metal barrel or body (such as machine-turned aluminum or the like) and accommodates a lens or plurality of lens or optic elements within and along the barrel. The adhesive ring 324 bonds a base portion 322a of the lens barrel 322 to the imager PCB 318 and encloses the optical path of the lens and imager 320 to keep the optical path free of contaminants. That is, the camera 314 uses adhesive attachment of the lens barrel 322 directly to the imager PCB 318. The PCB 318 and imager 320 may be adjusted in six axes and the adhesive ring 324 may be cured or at least partially cured when the imager 320 and lens are aligned.

Thus, the vehicular exterior camera provides improved optical path stability with a full ring of glue or adhesive around the imager at the PCB. In other words, the unibody lens is glued or adhered directly to the PCB to reduce tolerances and improve stability. There is a minimized glue or adhesive thickness to reduce variability. Additionally, the adhesive is a unique glue or adhesive with very low cure and long-term shrink characteristics. Additionally, the PCB and imager alignment with the lens allows for active rotation control. Furthermore, the vehicular exterior camera provides improved optical path cleanliness with an enclosed optical path between the lens and imager by way of the surrounding lens barrel, adhesive and imager PCB to prevent contamination after assembly using clean parts in a clean room.

Moreover, the camera provides reduced costs with minimized use of components. For example, existing machine vision cameras typically have sealing gaskets, screws, multiple PCBs with interconnections, metal casted or machined components, which are not cost competitive. Laser welding the front and rear housing portions provides cost advantages as no screws or gaskets are needed.

In the illustrated embodiments, the camera comprises an exterior-mounted camera, where a rear housing may be mated with the lens holder after the imager printed circuit board is attached to the lens barrel. The camera may utilize aspects of the camera assemblies described in U.S. Pat. Nos. 10,272,857 and/or 10,264,219, and/or U.S. Publication Nos. US-2022-0132007; US-2022-0103723 and/or US-2021-0382375, which are hereby incorporated herein by reference in their entireties. The camera assembly includes an electrical connector portion that is configured to electrically connect to a vehicle wire harness when the camera is installed at a vehicle.

The printed circuit boards may be attached at the lens holder or to the rear camera housing, and/or may be attached to one another, such as by utilizing aspects of the cameras and processes described in U.S. Publication No. US-2020-0010024, which is hereby incorporated herein by reference in its entirety. The imager is aligned with the lens at the lens holder and the lens is optically aligned and focused with the imager and the housing portions are joined or bonded, such as by utilizing aspects of the cameras and processes described in U.S. Pat. Nos. 10,272,857; 10,264,219; 9,451,138; 9,277,104 and/or 8,542,451, which are all hereby incorporated herein by reference in their entireties.

The camera may include electrical connecting elements that accommodate tolerances in the housing and/or PCB mounting and/or connector portion. The electrical connecting elements may utilize aspects of the cameras and electrical connectors described in U.S. Pat. No. 9,233,641 and/or U.S. Publication Nos. US-2013-0242099; US-2014-0373345; US-2015-0222795; US-2015-0266430; US-2015-0365569; US-2016-0037028; US-2016-0268716; US-2017-0133811; US-2017-0295306 and/or US-2017-0302829, which are hereby incorporated herein by reference in their entireties. Optionally, the electrical connections may be established via molded interconnect device (MID) technology, such as by utilizing aspects of the cameras described in U.S. Publication Nos. US-2018-0072239; US-2017-0295306 and/or US-2016-0037028, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

Optionally, aspects of the camera may be used for a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera, the vehicular camera comprising:
an imager printed circuit board (imager PCB), wherein the imager PCB comprises a first side and a second side opposite the first side and separated from the first side by a thickness of the imager PCB, and wherein an imager is disposed at the first side of the imager PCB;
a metal lens barrel having an inner end and an outer end, wherein the metal lens barrel accommodates a lens that comprises a plurality of lens optics disposed within the metal lens barrel between the inner end and the outer end;
wherein the inner end of the metal lens barrel is adhesively bonded to the first side of the imager PCB via an adhesive ring; and
wherein the adhesive ring is disposed between the inner end of the metal lens barrel and the first side of the imager PCB and circumscribes the imager at the first side of the imager PCB to enclose a region between the imager PCB and the lens, whereby the imager is disposed within the enclosed region between the imager PCB and the lens accommodated by the metal lens barrel.

2. The vehicular camera of claim 1, further comprising a connector printed circuit board (connector PCB) comprising circuitry that is electrically connected to circuitry of the imager PCB.

3. The vehicular camera of claim 2, wherein the connector PCB is attached to the imager PCB.

4. The vehicular camera of claim 2, comprising an electrical connecting element that is electrically conductively connected to an electrical connector of the connector PCB, and wherein the electrical connecting element is configured to electrically conductively connect to a connector of a vehicle cable when the vehicular camera is mounted at a vehicle.

5. The vehicular camera of claim 4, wherein the electrical connecting element comprises a coaxial connector that is configured to electrically conductively connect to a coaxial connector of a vehicle coaxial cable when the vehicular camera is mounted at the vehicle.

6. The vehicular camera of claim 1, wherein the metal lens barrel comprises a cylindrical lens barrel.

7. The vehicular camera of claim 1, wherein the inner end of the metal lens barrel is adhesively bonded via the adhesive ring to the first side of the imager PCB along a perimeter edge region of the first side of the imager PCB.

8. The vehicular camera of claim 1, wherein at least one electronic component is disposed at the first side of the imager PCB outside the enclosed region between the imager PCB and the lens.

9. The vehicular camera of claim 1, wherein the metal lens barrel comprises a sealed construction.

10. The vehicular camera of claim 1, wherein no part of the adhesive ring encroaches onto the imager.

11. The vehicular camera of claim 1, wherein, with the inner end of the metal lens barrel adhesively bonded to the first side of the imager PCB via the adhesive ring, the imager PCB is accommodated by a camera housing.

12. The vehicular camera of claim 11, wherein a portion of the metal lens barrel protrudes through the camera housing to exterior of the camera housing.

13. The vehicular camera of claim 11, wherein the camera housing comprises a first portion and a second portion that are joined together.

14. The vehicular camera of claim 13, wherein a portion of the metal lens barrel protrudes through the first portion of the camera housing to exterior of the camera housing.

15. The vehicular camera of claim 13, wherein the first portion and the second portion are joined together after the inner end of the metal lens barrel is adhesively bonded at the first side of the imager PCB via the adhesive ring.

16. The vehicular camera of claim 13, wherein the camera housing comprises metal camera housing.

17. The vehicular camera of claim 1, wherein the vehicular camera comprises a forward-viewing camera that, with the vehicular camera mounted at a windshield of a vehicle, views forward of the vehicle through the windshield of the vehicle.

18. The vehicular camera of claim 1, wherein the vehicular camera comprises a rearward-viewing camera that, with the vehicular camera mounted at a vehicle, views rearward of the vehicle.

19. A vehicular camera, the vehicular camera comprising:
an imager printed circuit board (imager PCB), wherein the imager PCB comprises a first side and a second side opposite the first side and separated from the first side by a thickness of the imager PCB, and wherein an imager is disposed at the first side of the imager PCB;
a metal lens barrel having an inner end and an outer end, wherein the metal lens barrel accommodates a lens that comprises a plurality of lens optics disposed within the metal lens barrel between the inner end and the outer end;
wherein the inner end of the metal lens barrel is adhesively bonded to the first side of the imager PCB via an adhesive ring;
wherein the adhesive ring is disposed between the inner end of the metal lens barrel and the first side of the imager PCB and circumscribes the imager at the first side of the imager PCB to enclose a region between the imager PCB and the lens, whereby the imager is disposed within the enclosed region between the imager PCB and the lens accommodated by the metal lens barrel;
wherein no part of the adhesive ring encroaches onto the imager; and
wherein, with the inner end of the metal lens barrel adhesively bonded to the first side of the imager PCB via the adhesive ring, the imager PCB is accommodated by a metal camera housing.

20. The vehicular camera of claim 19, further comprising a connector printed circuit board (connector PCB) accommodated by the metal camera housing, wherein the connector PCB comprises circuitry that is electrically connected to circuitry of the imager PCB.

21. The vehicular camera of claim 20, wherein the connector PCB is attached to the imager PCB.

22. The vehicular camera of claim 20, comprising an electrical connecting element that is electrically conductively connected to an electrical connector of the connector PCB, and wherein the electrical connecting element is accessed from exterior the metal camera housing and is configured to electrically conductively connect to a connector of a vehicle cable when the vehicular camera is mounted at a vehicle.

23. The vehicular camera of claim 22, wherein the electrical connecting element comprises a coaxial connector that is configured to electrically conductively connect to a coaxial connector of a vehicle coaxial cable when the vehicular camera is mounted at the vehicle.

24. The vehicular camera of claim 19, wherein the metal lens barrel comprises a cylindrical lens barrel.

25. The vehicular camera of claim 19, wherein the inner end of the metal lens barrel is adhesively bonded via the adhesive ring to the first side of the imager PCB along a perimeter edge region of the first side of the imager PCB.

26. The vehicular camera of claim 19, wherein at least one electronic component is disposed at the first side of the imager PCB outside the enclosed region between the imager PCB and the lens.

27. The vehicular camera of claim 19, wherein the metal lens barrel comprises a sealed construction.

28. The vehicular camera of claim 19, wherein a portion of the metal lens barrel protrudes through the metal camera housing to exterior of the metal camera housing.

29. The vehicular camera of claim 19, wherein the metal camera housing comprises a first portion and a second portion that are joined together.

30. The vehicular camera of claim 29, wherein a portion of the metal lens barrel protrudes through the first portion of the metal camera housing to exterior of the metal camera housing.

31. The vehicular camera of claim 29, wherein the first portion and the second portion are joined together after the inner end of the metal lens barrel is adhesively bonded at the first side of the imager PCB via the adhesive ring.

32. The vehicular camera of claim 19, wherein the vehicular camera comprises a forward-viewing camera that, with the vehicular camera mounted at a windshield of a vehicle, views forward of the vehicle through the windshield of the vehicle.

33. The vehicular camera of claim 19, wherein the vehicular camera comprises a rearward-viewing camera that, with the vehicular camera mounted at a vehicle, views rearward of the vehicle.

34. A vehicular camera, the vehicular camera comprising:

an imager printed circuit board (imager PCB), wherein the imager PCB comprises a first side and a second side opposite the first side and separated from the first side by a thickness of the imager PCB, and wherein an imager is disposed at the first side of the imager PCB;

a metal lens barrel having an inner end and an outer end, wherein the metal lens barrel accommodates a lens that comprises a plurality of lens optics disposed within the metal lens barrel between the inner end and the outer end;

wherein the inner end of the metal lens barrel is adhesively bonded to the first side of the imager PCB via an adhesive ring;

wherein the metal lens barrel comprises a cylindrical lens barrel;

wherein the adhesive ring is disposed between the inner end of the metal lens barrel and the first side of the imager PCB and circumscribes the imager at the first side of the imager PCB to enclose a region between the imager PCB and the lens, whereby the imager is disposed within the enclosed region between the imager PCB and the lens accommodated by the metal lens barrel;

wherein, with the inner end of the metal lens barrel adhesively bonded to the first side of the imager PCB via the adhesive ring, the imager PCB is accommodated by a camera housing;

wherein the camera housing comprises a first portion and a second portion that are joined together after the inner end of the metal lens barrel is adhesively bonded at the first side of the imager PCB via the adhesive ring; and wherein the cylindrical lens barrel protrudes through the first portion of the camera housing to exterior of the camera housing.

35. The vehicular camera of claim 34, further comprising a connector printed circuit board (connector PCB) comprising circuitry that is electrically connected to circuitry of the imager PCB.

36. The vehicular camera of claim 35, wherein the connector PCB is attached to the imager PCB.

37. The vehicular camera of claim 35, comprising an electrical connecting element that is electrically conductively connected to an electrical connector of the connector PCB, and wherein the electrical connecting element is configured to electrically conductively connect to a connector of a vehicle cable when the vehicular camera is mounted at a vehicle.

38. The vehicular camera of claim 37, wherein the electrical connecting element comprises a coaxial connector that is configured to electrically conductively connect to a coaxial connector of a vehicle coaxial cable when the vehicular camera is mounted at the vehicle.

39. The vehicular camera of claim 34, wherein the inner end of the metal lens barrel is adhesively bonded via the adhesive ring to the first side of the imager PCB along a perimeter edge region of the first side of the imager PCB.

40. The vehicular camera of claim 34, wherein at least one electronic component is disposed at the first side of the imager PCB outside the enclosed region between the imager PCB and the lens.

41. The vehicular camera of claim 34, wherein the metal lens barrel comprises a sealed construction.

42. The vehicular camera of claim 34, wherein no part of the adhesive ring encroaches onto the imager.

43. The vehicular camera of claim 34, wherein the vehicular camera comprises a forward-viewing camera that, with the vehicular camera mounted at a windshield of a vehicle, views forward of the vehicle through the windshield of the vehicle.

44. The vehicular camera of claim 34, wherein the vehicular camera comprises a rearward-viewing camera that, with the vehicular camera mounted at a vehicle, views rearward of the vehicle.

*   *   *   *   *